United States Patent
Griffin et al.

(10) Patent No.: US 7,962,961 B1
(45) Date of Patent: Jun. 14, 2011

(54) RESPONDING TO DETECTED APPLICATION VULNERABILITY EXPLOITS

(75) Inventors: Kent E. Griffin, Santa Monica, CA (US); Tzi-cker Chiueh, Los Angeles, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 805 days.

(21) Appl. No.: 11/956,172

(22) Filed: Dec. 13, 2007

(51) Int. Cl.
*G06F 21/22* (2006.01)
*G06F 15/16* (2006.01)
*G06F 11/30* (2006.01)

(52) U.S. Cl. .......................... 726/25; 709/224

(58) Field of Classification Search ................. None
See application file for complete search history.

(56) References Cited

U.S. PATENT DOCUMENTS

| | | | | |
|---|---|---|---|---|
| 5,974,549 | A * | 10/1999 | Golan | 726/23 |
| 7,278,161 | B2 * | 10/2007 | Lingafelt et al. | 726/23 |
| 7,562,138 | B2 * | 7/2009 | Kilian | 709/224 |
| 7,716,726 | B2 * | 5/2010 | Phillips et al. | 726/11 |
| 7,716,727 | B2 * | 5/2010 | Phillips et al. | 726/11 |
| 7,793,338 | B1 * | 9/2010 | Beddoe et al. | 726/3 |
| 7,793,348 | B2 * | 9/2010 | Lingafelt et al. | 726/23 |
| 7,845,006 | B2 * | 11/2010 | Akulavenkatavara et al. | 726/22 |
| 2006/0095965 | A1 * | 5/2006 | Phillips et al. | 726/22 |
| 2007/0083933 | A1 * | 4/2007 | Venkatapathy et al. | 726/25 |

OTHER PUBLICATIONS

Bob Sheep, "Low Fragmentation Heap and Function Interception", The Code Project, Jan. 14, 2004, 2 pages, [online] [Retrieved on Dec. 22, 2008] Retrieved from the Internet <URL:http://www.codeproject.com/KB/cpp/LFH.aspx?display=Print>.

"Exception handling", Wikipedia, 9 pages, [online] [Retrieved on Dec. 22, 2008] Retrieved from the Internet <URL:http://en.wikipedia.org/wiki/Exception_handling>.

Galen Hunt et al., "Detours: Binary Interception of Win32 Functions", Proceedings of the 3rd USENIX Windows NT Symposium, Jul. 1999, Seattle, Washington, 9 pages.

Kiem-Phong Vo et al., "Xept: A Software Instrumentation Method for Exception Handling", Proceedings of the International Symposium on Software Reliability Engineering (ISSRE), 1997, 10 pages.

\* cited by examiner

*Primary Examiner* — Christopher A Revak
(74) *Attorney, Agent, or Firm* — Fenwick & West LLP

(57) ABSTRACT

A security module detects attempted exploitations of vulnerabilities of an application executing on a computer. A robust function of the application having native error handling functionality is identified. The security module wraps the robust function with an exception handler that catches a "security violation" exception. The exception handler returns an error code of a type that is handled by the application's native error handling functionality. The security module also hooks the application. When a hook is followed, the security module determines whether a vulnerability in the application is being exploited. If an attempted exploit is detected, the security module throws the security violation exception. The application's native error handling functionality unwinds the call stack for the application until it reaches the exception handler wrapping the robust function. The exception handler catches the security violation exception and returns the error code to the application's native error handling functionality.

20 Claims, 5 Drawing Sheets

RESPONDING TO DETECTED APPLICATION VULNERABILITY EXPLOITS

BACKGROUND OF THE INVENTION

1. Field of the Invention

This invention pertains in general to computer security and in particular to detecting and responding to attempted exploits of vulnerabilities of applications and other programs executing on a computer.

2. Description of the Related Art

Applications executed on modern computers are often susceptible to a wide variety of network-based attacks. Web browsers, for example, are particularly susceptible to attacks because browsers receive large amounts of content from the Internet. The content can include hypertext markup language (HTML) web pages, scripts in languages such as VBScript and JavaScript, and executable content. Other types of applications are also vulnerable. For example, email programs and even word processors provide interfaces for executing network-based content.

Malicious attackers can compromise such applications by crafting specially-formulated inputs that exploit vulnerabilities in the programs. Each input contains code that, when executed, gives the attackers control over the applications and allows them to perform malicious acts such as capturing keystrokes, sending messages on the network, deleting files, installing malicious software (malware) such as spyware and adware, etc.

One technique for detecting and preventing these malicious exploits is scanning network traffic entering the computer in order to detect malicious code. For example, an intrusion detection system (IDS) can scan network traffic entering an enterprise network for characteristics of malicious code, and then prevent the code from entering the enterprise. A problem with this approach is that attackers use classical obfuscation and encryption techniques to evade detection. For example, an attacker can create a seemingly-innocent script that passes through the IDS but produces a malicious script when executed by an application.

Security software is often configured to detect exploits at the application level due to the difficulty with network-based detection described above. Unfortunately, application-level detection means that when the exploit is detected, the vulnerable application may have already begun to process the input that constitutes the exploit. As a result, it is difficult to block the exploit without terminating or otherwise adversely impacting the application.

BRIEF SUMMARY

The difficulties described above are addressed by a computer, method, and computer-readable storage medium that use the application's native error handling functionality to address an attempted vulnerability exploit. A computer adapted to detect an attempted exploit of a vulnerability of an application executed by the computer, the application having a native robust function having associated native error handling functionality, comprises an analysis module configured to determine whether malicious code is attempting to exploit a vulnerability of the application. The computer also comprises an exception generation module configured to throw a security violation exception that is not native to the application responsive to the determination that malicious code is attempting to exploit the vulnerability. The computer further comprises a function wrapping module configured to wrap a native robust function of the application with an exception handler configured to catch the security violation exception and to activate native error handling functionality associated with the robust function in response to catching the security violation exception.

Embodiments of the method comprise determining whether malicious code is attempting to exploit a vulnerability of the application and throwing a security violation exception that is not native to the application responsive to the determination that malicious code is attempting to exploit the vulnerability. The method also comprises wrapping the native robust function of the application with an exception handler configured to catch the security violation exception and to activate the native error handling functionality associated with the robust function in response to catching the security violation exception.

Embodiments of the computer-readable storage medium comprise an analysis module configured to determine whether malicious code is attempting to exploit a vulnerability of the application. The computer-readable storage medium also comprises an exception generation module configured to throw a security violation exception that is not native to the application responsive to the determination that malicious code is attempting to exploit the vulnerability. The computer-readable storage medium further comprises a function wrapping module configured to wrap a native robust function of the application with an exception handler configured to catch the security violation exception and to activate native error handling functionality associated with the robust function in response to catching the security violation exception.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
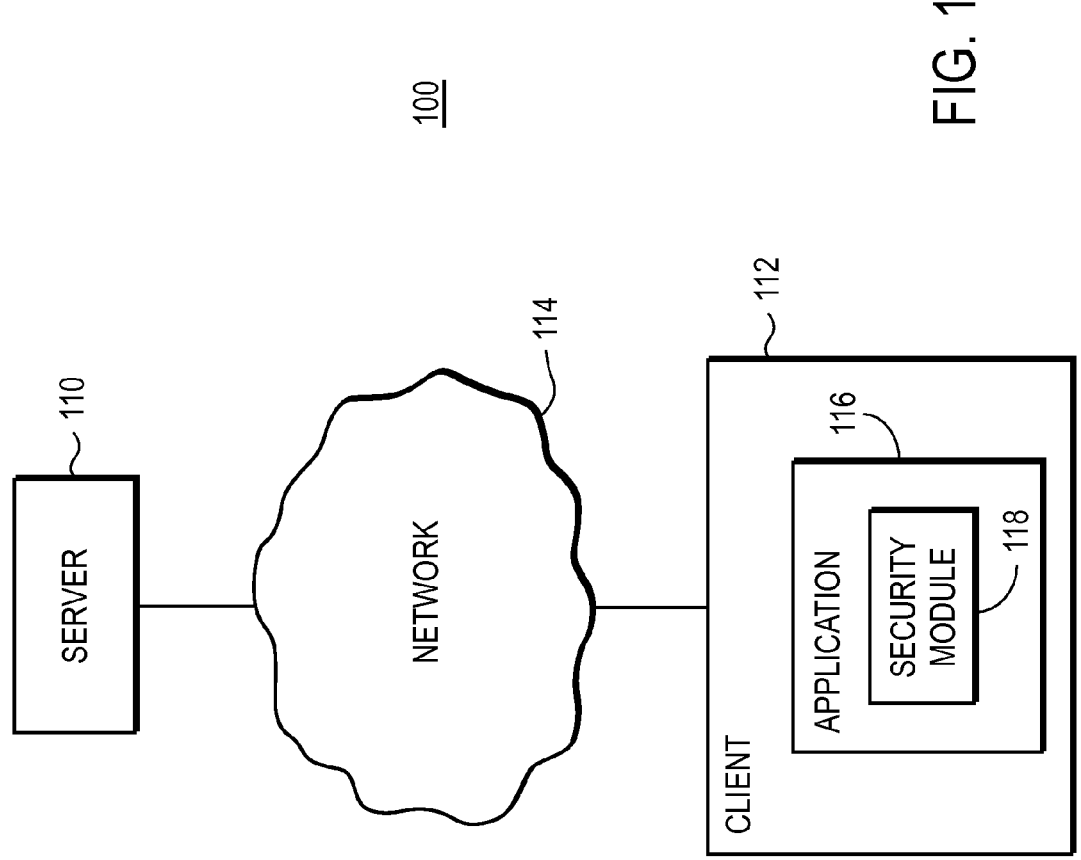
FIG. 1 is a high-level block diagram of a computing environment according to one embodiment.

FIG. 1 is a high-level block diagram of a computing environment 100 according to one embodiment. FIG. 1 illustrates a server 110 and a client 112 connected by a network 114. Only one server 110 and one client 112 are shown in FIG. 1 in order to simplify and clarify the description. Embodiments of the computing environment 100 can have thousands or millions of servers 110 and clients 112 connected to the network 114.

The server 110 provides content to the client 112 via the network 114. In one embodiment, the server 110 is a web server that provides content such as HTML web pages, scripts written in interpreted languages such as VBScript and JavaScript, executable programs, images, music, multimedia content, and the like. In other embodiments, the server 110 is a different type of server, such as a server dedicated to providing a specific type of content.

In some instances, the server 110 may surreptitiously provide malicious code to the client 112. For example, the server 110 may include a malicious script as part of a seemingly-innocuous web page. The script, when executed by the client 112, attempts to compromise the client by exploiting a vulnerability of a client application. One common vulnerability is a buffer overflow, where the malicious code can compromise the client 112 by storing data beyond the boundaries of a fixed-length buffer and thereby overwriting adjacent memory locations. Another common vulnerability is faulty logic error processing, where the malicious code performs an illogical operation that causes the computer to enter a state where it can be compromised. Once the client 112 is compromised, the code can perform other malicious actions.

In one embodiment, the client 112 is a computer used by one or more users to connect to servers 110, such as web servers, on the network 114. The client 112, for example, can be a personal computer or other network-capable device like a personal digital assistant (PDA), mobile telephone, pager, or television "set-top box." For purposes of this description, the term "client" also includes computers such as servers and gateways that have the characteristics described herein.

The client 112 executes one or more applications 116 such as a web browser, email program, word processor, spreadsheet, image viewer, or music player. The application 116 has an interface for executing or otherwise loading content received from the server 110 via the network 114, stored on a local disk, or located elsewhere. In a common example, the application 116 is a web browser such as MICROSOFT INTERNET EXPLORER or MOZILLA FIREFOX that includes functionality for downloading web pages from the server 110 and executing scripts written in VBScript or JavaScript contained therein. As mentioned above, some content downloaded and/or accessed by an application 116 contains malicious code that attempts to exploit a vulnerability in the application and thereby compromise the client 112. For example, VBScript code can attempt to exploit a vulnerability in the web browser or other application executing the script. "Executing" as used herein also includes methods such as interpreting scripts and performing just-in-time (JIT) compiling of scripts into bytecode.

A security module 118 executing on the client 112 detects when malicious code such as a script is attempting to exploit a vulnerability of an application 116 and blocks the exploit. In one embodiment, the security module 118 hooks certain functions in the application 116 when the application's executable image is loaded into memory. In addition, the security module 118 wraps a robust function in the application 118 with a specialized exception handler. The robust function is one for which the application 118 provides robust error handling functionality.

The hooks cause control to pass to the security module 118 when a hooked function is executed by the application 116. The security module 118 analyzes the state of the client 112 and/or application 116 to determine whether a vulnerability exploit is occurring. If an exploit is occurring, the security module 118 throws (generates) a "security violation" exception that is handled by only the specialized exception handler. The native exception handling functionality of the application 116 unwinds the call stack for the application until it reaches the specialized exception handler wrapped around the robust function. The specialized exception handler catches (processes) the security violation exception and returns an error code of a type that the application natively handles to the caller of the robust function. Thus, an attempted vulnerability exploit detected by the security module 118 is gracefully handled by the application's own error handling functionality. In many cases, the application 116 will continue to run normally.

The network 114 represents the communication pathways between the server 110 and client 112. In one embodiment, the network 114 is the Internet. The network 114 can also utilize dedicated or private communications links that are not necessarily part of the Internet. In one embodiment, the network 114 uses standard communications technologies and/or protocols such as Ethernet, 802.11, etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
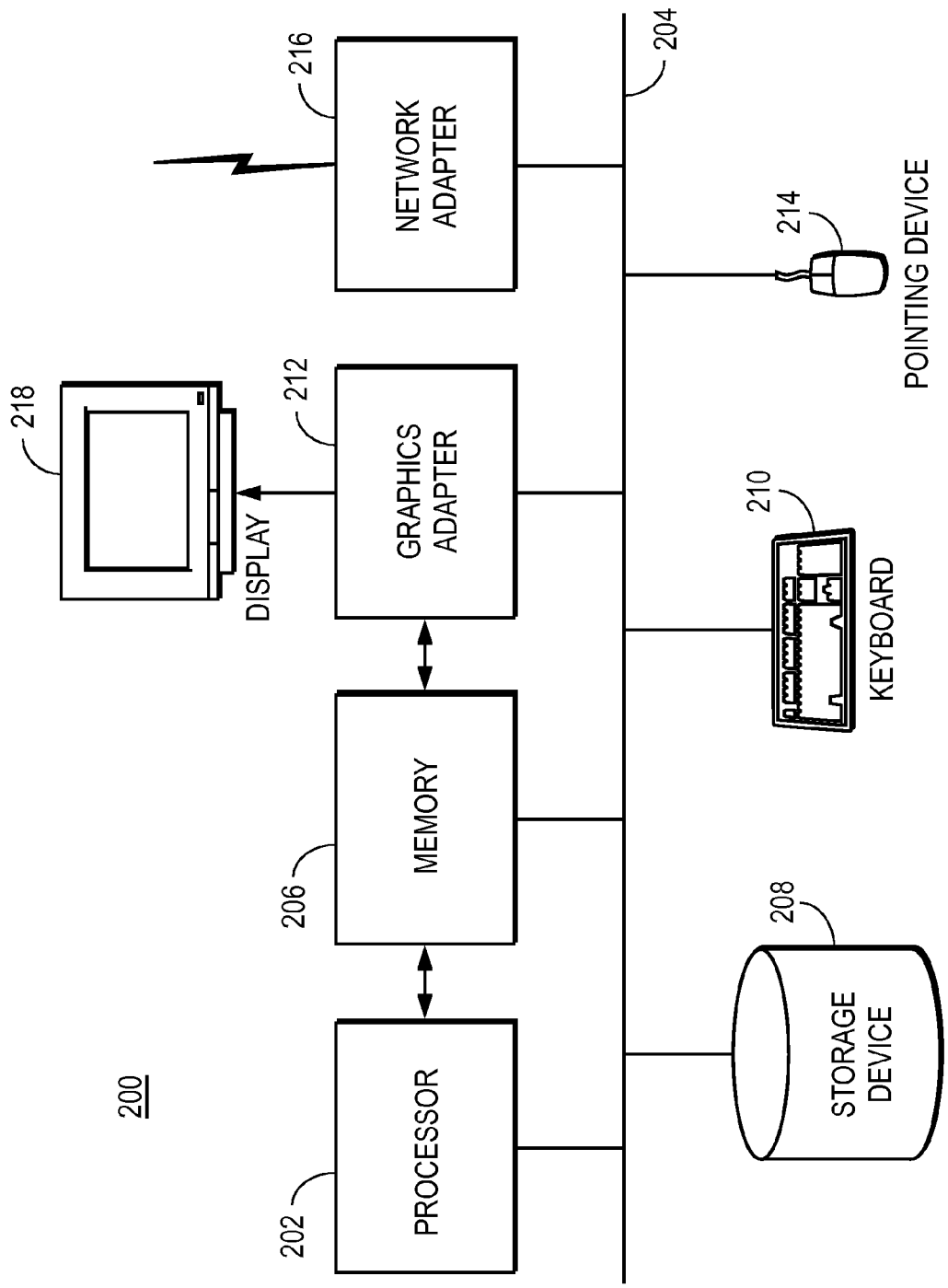
FIG. 2 is a high-level block diagram illustrating a typical computer for use as a server or client according to one embodiment.

FIG. 2 is a high-level block diagram illustrating a typical computer 200 for use as a server 110 or client 112 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The types of computers 200 utilized by the entities of FIG. 1 can vary depending upon the embodiment and the processing power utilized by the entity. For example, a client 112 that is a mobile telephone typically has limited processing power, a small display 218, and might lack a pointing device 214. The server 110, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. The application is formed of one or more files that typically reside on the storage device 208 and are loaded into memory 206 when executed. At least one of the files loaded into memory 206 is referred to as the "executable image" and is executed as a process.

Figure 3:
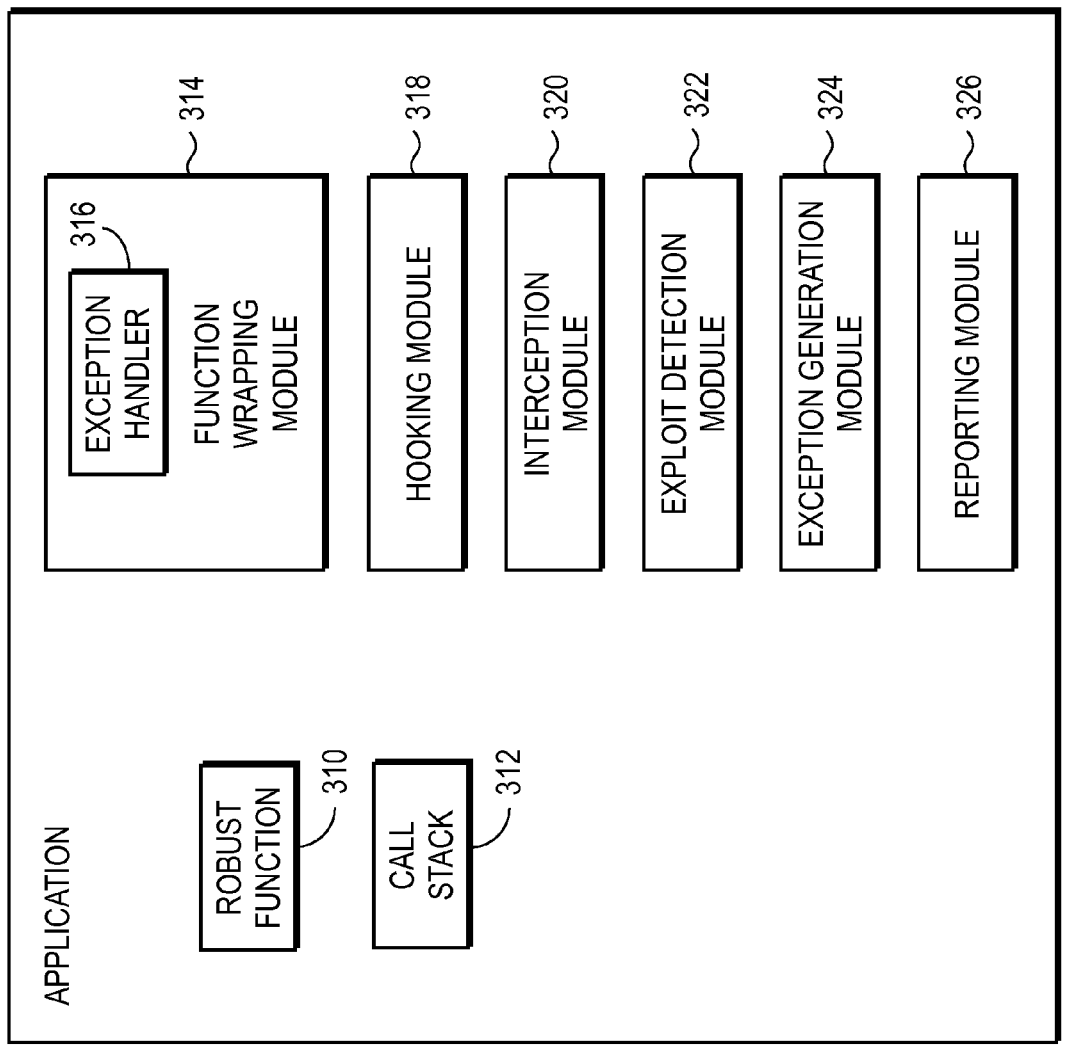
FIG. 3 is a high-level block diagram illustrating a detailed view of the application and security module according to one embodiment.

FIG. 3 is a high-level block diagram illustrating a detailed view of the application 116 and security module 118 according to one embodiment. The application includes a robust function 310 and a call stack 312. The robust function 310 is a subroutine in the application 116 that is always, or almost always, present in the call stack 312 and has robust error handling associated with it. Said another way, the robust function is one that performs tasks in which errors often occur and, therefore, the application includes error handling functions for dealing with the errors. For example, if the application is a web browser, the robust function 310 can be the routine that requests, retrieves, and renders a web page for display. There are many errors that might occur during these processes. For example, the web browser can receive an incomplete or malformed input from a web site, fail to resolve the IP address of the web site, or not receive a response from the web site. The web browser typically has robust native error handling functionality for dealing with these and other types of errors. As used herein, the term "native" refers to functionality that is present in the application 116 in the absence of the security module 118 or other third party add-ins. Thus, the native error handling functionality of the application includes the functionality built into the application by its developers.

The call stack 312 is a dynamic stack data structure which stores information about the active subroutines of the application 116. When the application 116 calls a function or other subroutine, the application pushes the return address of the current function onto the stack. When the called function finishes, the return address of the calling function is popped off the stack and execution continues at that address.

As mentioned above, the robust function 310 is always, or almost always, present in the call stack. When the application 116 executes, a calling function within the application will typically call the robust function 310. The robust function will in turn call other functions. Thus, the return address of the robust function 310, and the function that called the robust function, will be on the call stack 312 during normal execution of the application 116.

FIG. 3 illustrates the security module 118 within the application 116 because one embodiment of the security module 118 inserts functionality into the application. However, the security module 118 is not necessarily located within the application 116 and, in many embodiments, is distinct from the application. In some embodiments the security module 118 is incorporated into an operating system executing on the client 112 while in other embodiments the security module is a standalone application or part of another product. As shown in FIG. 3, the security module 118 itself includes multiple modules. Those of skill in the art will recognize that other embodiments of the security module 118 can have different and/or other modules than the ones described here, and that the functions can be distributed among the modules in a different manner.

A function wrapping module 314 wraps the robust function 310 of the application 116 with a wrapping function. The wrap causes a call that would normally invoke the robust function 310 to instead invoke the wrapping function. In one embodiment, the function wrapping module 314 wraps the robust function 310 when the application image is loaded into memory.

In one embodiment, the wrapping function wraps the robust function 310 in an exception handler 316 including a "try/catch" statement. A try/catch statement includes a "try { . . . }" section that contains code that might throw an exception and a "catch" section that includes handler code that catches certain types of exceptions. If a catch section does not catch the particular type of exception that was thrown, the application's native exception handling functionality will unwind the call stack until it reaches a "catch" section that catches the exception. In this embodiment, the code of the robust function 310 is wrapped within the "try" section. In addition, the "catch" section is configured to handle one or more specific "security violation" exceptions that are thrown only in response to the security module 118 detecting an attempted exploit of a vulnerability in the application 116.

If the catch section of the exception handler 316 detects a security violation exception, it returns an error message back to the calling function (i.e., the function that called the robust function 310). In one embodiment, the error message is in the form of a standard function error code. For example, in embodiments using the MICROSOFT WINDOWS operating system, the error message can take the form of a standard HRESULT value. In embodiments using a variant of the UNIX operating system, the error message can take the form of a Boolean value. The calling function will process the error message using the application's native error handling functions. For example, if the application 116 is a web browser and the robust function 310 retrieves a web page from a web site, the error message returned by the exception handler 316 can indicate that an object on the web page failed to retrieve properly. The application's native error handling function can handle this error, e.g., by attempting to retrieve the object again or displaying an error message to the user of the client.

An embodiment of the security module 118 includes a hooking module 318. The hooking module 318 hooks locations in the application 116 to transfer control flow to the security module 118. In one embodiment, the hooking module 318 hooks the application 116 at locations corresponding to functions, methods or interfaces likely to be used by multiple types of exploits. For example, the hooking module 318 hooks the interfaces provided by the scripting component of the application 116 that allow executing scripts to interact with the other components of the application. Virtually all malicious scripts must interact with components other than the scripting components in order to perform malicious actions. Therefore, the interfaces provided by the scripting components serve as a "funnel" or "chokepoint" where a single hook allows detection of multiple types of vulnerability exploits. Different embodiments of the hooking module 318 hook different and/or other locations, depending upon variations such as the operating system executing on the client 112, the application 116, and the particular vulnerabilities and exploits detected by the security module 118.

The hooking module 318 uses different hooking techniques in different embodiments. If the application 116 is a web browser, an embodiment of the hooking module installs a browser helper object (BHO) that acts as a hook. The BHO has access to the application programming interface (API) of the web browser and can monitor operations performed by the web browser. Other embodiments use dynamic link library (DLL) injection techniques to hook the application 116.

An interception module 320 activates when hooked code in the application 116 is executed. An embodiment of the interception module 320 saves the state of the application 116, including the parameters of the hooked call (if any), for analysis. In addition, an embodiment of the interception module 320 restores the original state of the application 116 and transfers control flow back to the application if the analysis indicates that no exploit is in progress.

An exploit detection module 322 analyzes the state of the application 116 and/or client 112 to determine whether an attempted vulnerability exploit is in progress. In one embodiment, the exploit detection module 322 uses a virtual machine in which the state of the application can be analyzed without influencing the external state of the application 116 or client 112. The virtual machine is bytecode-driven and provides general Turing machine functionality allowing it to execute bytecode programs supporting essentially any type of analysis. The virtual machine 316 selectively executes programs called "signatures" that are designed to programmatically analyze the state of the application 116 and/or client 112 in order to detect whether a hooked call is attempting to exploit a vulnerability. Different signatures allow detection of different types of exploits. In one embodiment, each signature is designed to detect an exploit of a particular vulnerability of a particular application. For example, one signature is designed to detect a logic error such as whether HTML code is exploiting a vulnerability of a particular web browser by creating an object as a child object of a parent, where the parent is not allowed to have a child object. Another signature, in contrast, is designed to detect an exploit of a buffer overflow vulnerability of an email program by determining whether a script is attempting to copy a parameter into a too-small destination buffer.

An exception generation module 324 throws a security violation exception if an attempted exploit is detected by the exploit detection module 322. In one embodiment, the exception generation module 324 throws only a single type of security violation exception, while in other embodiments it throws different types of exceptions depending upon the type of detected exploit and/or other factors. Since the security violation exception is not native to the application 116, any native try/catch statements in the application will not catch the exception (aside from catch-all statements as mentioned below). Accordingly, the application's native exception handler will unwind the application's call stack 312 until it reaches the exception handler 316 that wraps the robust function 310. This function handler 316 catches the security violation exception as described above.

A reporting module 326 reports the results of the analyses performed by the security module 118. In one embodiment, the reporting module 326 provides an alert, dialog box, or other user interface notification to a user of the client 112 if an exploit is detected and/or blocked. The reporting module 326 can perform additional actions such as maintaining a log of analyses performed or exploits detected by the exploit detection module 322.

Figure 4:
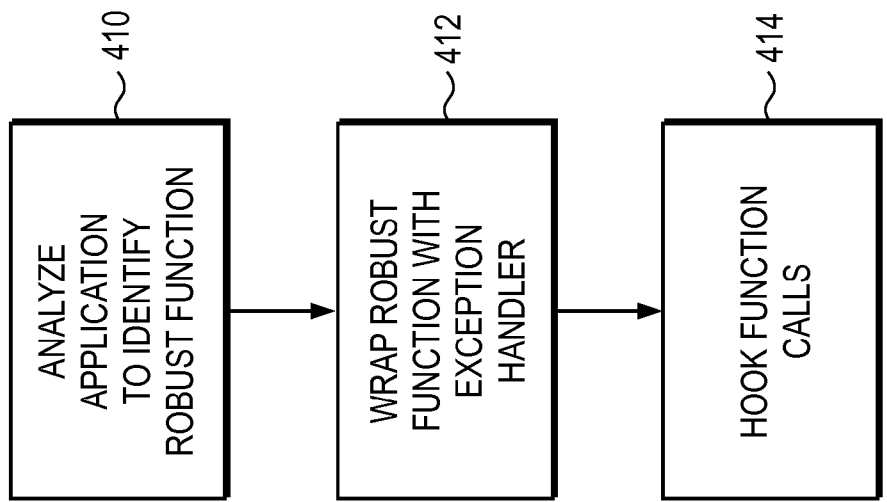
FIG. 4 is a flowchart illustrating steps for using the security module to provide security to a client according to one embodiment.

FIG. 4 is a flowchart illustrating steps for using the security module 118 to provide security to a client 112 according to one embodiment. Other embodiments perform the illustrated steps in different orders, and/or perform different or additional steps. The steps can be performed by multiple entities at different points in time.

The application 116 is analyzed 410 to identify a robust function 310. In one embodiment, this analysis is performed by a security specialist working for the enterprise that provides the security module 118. For example, the security specialist can be employed by the enterprise for the purpose of identifying robust functions 310 in common and popular applications. In one embodiment, this analysis 410 is performed by examining the operation of the application using a debugger or other analysis tool. A typical application has only a small number of calls in its call stack. Thus, the security specialist can analyze each function in the call stack to identify the robust function. In addition, the security specialist can use the analysis tool to investigate the native error handling functions of the application and identify the error codes it uses to represent different types of errors.

An application 116 might include one or more native exception handlers that unintentionally catch the security violation exception issued by the exception generation module 324. For example, the application 116 can include a native exception handler that catches all exceptions. Any such native exception handlers are detected when the application is analyzed 410 to identify the robust function 310. These exception handlers are subverted or disabled when security violation exceptions are thrown.

In one embodiment, the results of the analysis are provided to security modules 118 in the clients 112 via the network 114 or other means. Data describing the locations of robust functions in multiple common applications are stored in a file which is then distributed to the security modules 118 at the clients 112 as a software update. The security module at a client 112 receives the software update and identifies any of the common applications that are installed on the client.

The security module 118 at the client 112 wraps 412 the robust function 310 of an application 116 with the exception handler 316. The wrapping 412 can occur when the application is executed by the client 112 or at other times. In addition, the security module 118 hooks 414 function calls in the application. The security module 118 also modifies any native exception handlers that catch the security violation exception so that they no longer catch it. This modification occurs when the security violation exception is thrown because exception handlers are generally dynamically-created and thus cannot be "patched" statically like other types of intercepted functions.

Figure 5:
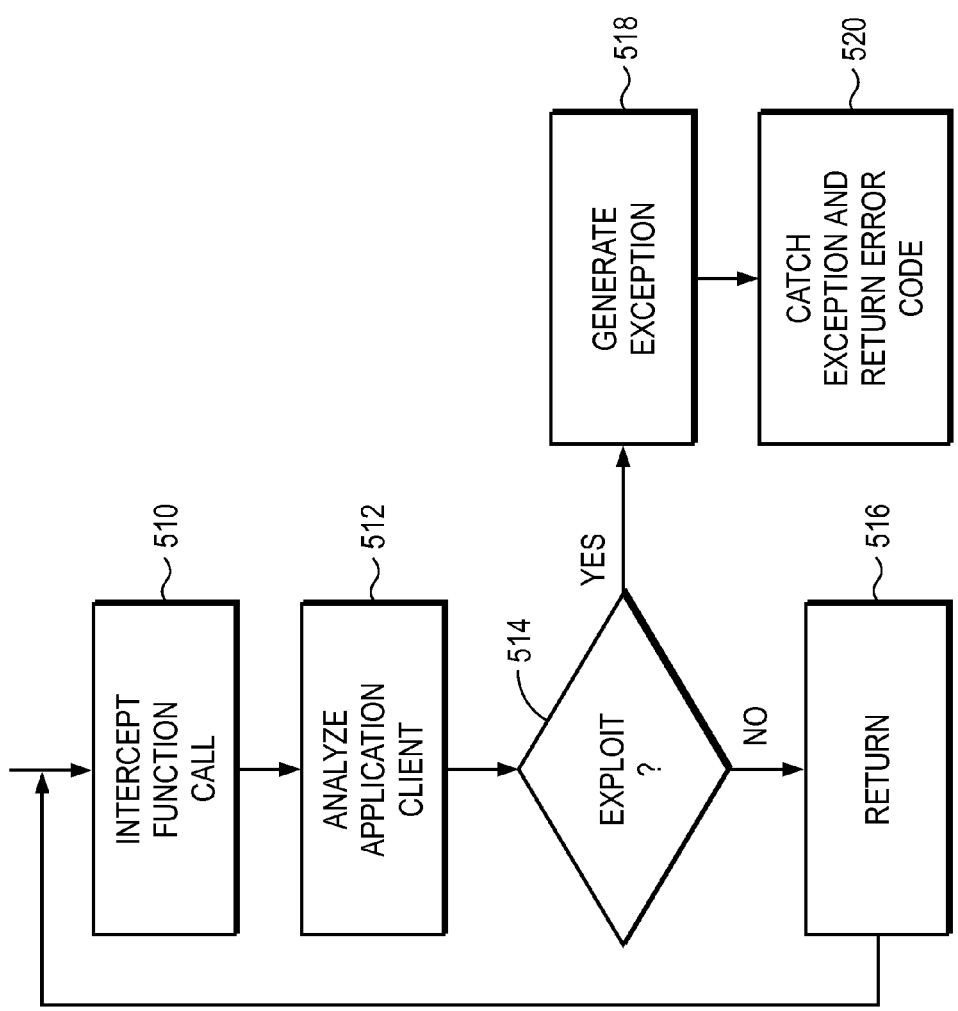
FIG. 5 is a flowchart illustrating steps performed by the security module to provide security to a client according to one embodiment.

FIG. 5 is a flowchart illustrating steps performed by the security module 118 to provide security to a client 112 according to one embodiment. Other embodiments perform the illustrated steps in different orders, and/or perform different or additional steps.

A hooked function call of the application 116 is intercepted 510. The state of the application and/or client 112 is analyzed 512 to determine whether an attempted exploit of a vulnerability is in progress. If 514 no exploit is in progress, the execution is returned 516 to the hooked function. If 514, on the other hand, an exploit is in progress, then the security module 118 throws 518 a security violation exception. The application's native error handling code unwinds the call stack 312 until it reaches the exception handler 316 wrapping the robust function 310. This exception handler catches 520 the exception and returns an error code to the function that called the robust function 310, thereby invoking the application's native error handling functionality. The application 116 handles the security violation in the same manner as it handles normal errors.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer adapted to detect an attempted exploit of a vulnerability of an application executed by the computer, the application having a native robust function having associated native error handling functionality, comprising:
 a non-transitory computer-readable storage medium having executable computer program instructions embodied therein comprising:

an analysis module configured to determine whether malicious code is attempting to exploit the vulnerability of the application;
  an exception generation module configured to throw a security violation exception that is not native to the application responsive to the determination that malicious code is attempting to exploit the vulnerability; and
  a function wrapping module configured to wrap the native robust function of the application with an exception handler configured to catch the security violation exception and to activate the native error handling functionality associated with the robust function in response to catching the security violation exception; and
  a processor for executing the computer program instructions.

2. The computer of claim 1, wherein the exception handler is further configured to return an error code of a type that is handled by the native error handling functionality associated with the robust function in response to catching the security violation exception.

3. The computer of claim 1, wherein the exception handler is a try/catch statement wherein a try portion of the try/catch statement includes the robust function and wherein a catch portion of the try/catch statement catches the security violation exception.

4. The computer of claim 1, further comprising:
  a module configured to disable any native exception handler in the application configured to catch the security violation exception.

5. The computer of claim 1, further comprising:
  a hooking module configured to hook an executable image of the application stored in a memory of the computer to transfer control flow to the analysis module responsive to execution of the hook.

6. The computer of claim 1, wherein the analysis module is further configured to selectively execute one or more signatures to programmatically analyze the state of the computer and/or application to detect an attempted exploit of a vulnerability of the application.

7. The computer of claim 1, further comprising:
  a reporting module configured to generate a report describing operations of the analysis, exception generation, and/or function wrapping modules to a user of the computer.

8. A method for detecting an attempted exploit of a vulnerability of an application executed by a computer, the application having a native robust function having associated native error handling functionality, comprising:
  using the computer to perform steps comprising:
    determining whether malicious code is attempting to exploit the vulnerability of the application;
    throwing a security violation exception that is not native to the application responsive to the determination that malicious code is attempting to exploit the vulnerability; and
    wrapping the native robust function of the application with an exception handler configured to catch the security violation exception and to activate the native error handling functionality associated with the robust function in response to catching the security violation exception.

9. The method of claim 8, wherein the exception handler is further configured to return an error code of a type that is handled by the native error handling functionality associated with the robust function in response to catching the security violation exception.

10. The method of claim 8, wherein the exception handler is a try/catch statement wherein a try portion of the try/catch statement includes the robust function and wherein a catch portion of the try/catch statement catches the security violation exception.

11. The method of claim 8, wherein the application includes a native exception handler configured to catch the security violation exception and further comprising:
  disabling the native exception handler in the application configured to catch the security violation exception.

12. The method of claim 8, further comprising:
  hooking an executable image of the application stored in a memory of the computer to transfer control flow to an analysis module configured to determine whether malicious code is attempting to exploit the vulnerability of the application responsive to execution of the hook.

13. The method of claim 8, wherein determining whether malicious code is attempting to exploit a vulnerability comprises:
  selectively executing one or more signatures to programmatically analyze the state of the computer and/or application to detect an attempted exploit of a vulnerability of the application.

14. A non-transitory computer-readable storage medium having executable computer program instructions embodied therein for detecting an attempted exploit of a vulnerability of an application executed by a computer, the application having a native robust function having associated native error handling functionality, comprising:
  an analysis module configured to determine whether malicious code is attempting to exploit the vulnerability of the application;
  an exception generation module configured to throw a security violation exception that is not native to the application responsive to the determination that malicious code is attempting to exploit the vulnerability; and
  a function wrapping module configured to wrap the native robust function of the application with an exception handler configured to catch the security violation exception and to activate the native error handling functionality associated with the robust function in response to catching the security violation exception.

15. The computer-readable storage medium of claim 14, wherein the exception handler is further configured to return an error code of a type that is handled by the native error handling functionality associated with the robust function in response to catching the security violation exception.

16. The computer-readable storage medium of claim 14, wherein the exception handler is a try/catch statement wherein a try portion of the try/catch statement includes the robust function and wherein a catch portion of the try/catch statement catches the security violation exception.

17. The computer-readable storage medium of claim 14, further comprising:
  a module configured to disable any native exception handler in the application configured to catch the security violation exception.

18. The computer-readable storage medium of claim 14, further comprising:
  a hooking module configured to hook an executable image of the application stored in a memory of the computer to transfer control flow to the analysis module responsive to execution of the hook.

19. The computer-readable storage medium of claim 14, wherein the analysis module is further configured to selectively execute one or more signatures to programmatically analyze the state of the computer and/or application to detect an attempted exploit of a vulnerability of the application.

20. The computer-readable storage medium of claim 14, further comprising:

a reporting module configured to generate a report describing operations of the analysis, exception generation, and/or function wrapping modules to a user of the computer.

* * * * *